US012346612B2

(12) United States Patent
Bavishi (10) Patent No.: US 12,346,612 B2
(45) Date of Patent: Jul. 1, 2025

(54) MEMORY SUB-SYSTEM COMMAND FENCING

(71) Applicant: Micron Technology, Inc., Boise, ID (US)

(72) Inventor: Dhawal Bavishi, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/615,760

(22) Filed: Mar. 25, 2024

(65) Prior Publication Data

US 2024/0231703 A1 Jul. 11, 2024

Related U.S. Application Data

(63) Continuation of application No. 17/464,813, filed on Sep. 2, 2021, now Pat. No. 11,941,291.

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC .... G06F 3/0659; G06F 3/0604; G06F 3/0673; G06F 3/0679; G06F 3/0614
See application file for complete search history.

(56) References Cited

U.S. PATENT DOCUMENTS

| | | | | |
|---|---|---|---|---|
| 9,384,523 B1 * | 7/2016 | Penner | ...................... | G06T 1/20 |
| 10,402,262 B1 | 9/2019 | Wu | | |
| 2008/0155315 A1 * | 6/2008 | Gunda | .................. | G06F 11/004 |
| | | | | 714/6.13 |
| 2008/0215768 A1 * | 9/2008 | Reid | ...................... | G06F 11/362 |
| | | | | 717/124 |
| 2017/0047119 A1 | 2/2017 | Xu | | |
| 2017/0068471 A1 * | 3/2017 | Paveza | .................. | G06F 3/0685 |
| 2017/0351433 A1 * | 12/2017 | Walker | .................. | G06F 3/0683 |
| 2018/0052609 A1 | 2/2018 | Guthrie | | |
| 2018/0260325 A1 | 9/2018 | Doshi | | |
| 2018/0284984 A1 * | 10/2018 | Candelaria | ............ | G06F 3/0685 |
| 2019/0179754 A1 | 6/2019 | Steinmacher-Burow | | |
| 2019/0205244 A1 * | 7/2019 | Smith | ..................... | G06F 3/065 |
| 2020/0371927 A1 | 11/2020 | Chachad | | |
| 2020/0371970 A1 | 11/2020 | Chachad | | |
| 2021/0011662 A1 * | 1/2021 | Debbins | .................. | G06F 3/061 |
| 2021/0248014 A1 | 8/2021 | Lustig | | |

* cited by examiner

*Primary Examiner* — Sean D Rossiter
(74) *Attorney, Agent, or Firm* — Brooks, Cameron & Huebsch, PLLC (57) ABSTRACT

A method includes memory fencing in memory components of a memory sub-system and receiving a first number of commands and a second number of command for execution on a memory sub-system, receiving a memory fencing command associated with the first number of commands and the second number of commands, and executing at least one of the first number of commands before executing at least one of the second number of commands in response to receiving the memory fencing command. The method further includes executing the at least one of the first number of commands by moving data from a first location in the memory subsystem to a second location in the memory sub-system and executing the at least one of the second number of commands by reading data from the second location in the memory sub-system and sending the data to a host system.

20 Claims, 4 Drawing Sheets

MEMORY SUB-SYSTEM COMMAND FENCING

PRIORITY INFORMATION

This Application is a Continuation of U.S. application Ser. No. 17/464,813, filed on Sep. 2, 2021, which will issue as U.S. Pat. No. 11,941,291 on Mar. 26, 2024, the contents of which are incorporated herein by reference.

TECHNICAL FIELD

Embodiments of the disclosure relate generally to memory sub-systems, and more specifically, relate to memory sub-system command fencing.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to memory sub-system fencing commands, in particular to memory sub-systems that include a memory sub-system fencing command component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

Memory sub-systems can be coupled to a processing resource connected via a deterministic protocol, such as DDR4. In some approaches, in order to maintain high-level coherence and in-order access between multiple software threads, processing resources can use memory fencing commands, which can be invoked from software using the deterministic protocol. Memory sub-systems can rearrange instructions ordering to get the maximum utilization out of the sub-system, as an example issue certain reads ahead of writes for optimal bus utilization and lower latency on such reads according to the deterministic protocol. These fencing commands ensure that reads and writes following the fence occur only after the reads and writes prior to the fence have occurred. Thus, using fencing commands ensures correctness between the multiple parallel execution threads or within a single execution thread, while maintaining hazard protection and having read and write requests queued for maximum utilization.

Aspects of the present disclosure address the above and other deficiencies by using memory fencing commands from the host system via a non-deterministic protocol and have the fencing command component of the memory sub-system controller understand the intent for commands on the memory sub-system prior to the fencing command and following the fencing command. For example, in some embodiments, a non-deterministic protocol can be used on a memory sub-system, such as a non-volatile dual in-line memory modules (NVDIMM-P) memory module and/or a Compute Express Link (CXL) attached memory device. The non-deterministic protocol allows to the memory sub-system to execute commands in an order that is different than the order than the commands are received. The memory fencing commands of the present disclosure can be used by the host system and the memory sub-system to ensure that certain commands are performed prior to other commands according to instructions in the memory fencing commands, even while using the non-deterministic protocol.

For example, a host system can issue a data movement command followed by a read command, where the data movement command moves data to the address where the data read command is reading data from. In embodiments of the present disclosure, a memory fence command can be sent to the memory sub-system that includes instructions for the data movement command to be performed before the read command. In response to receiving the memory fence command, the fencing command component on the memory sub-system controller can instruct the memory sub-system to treat the data movement command and the read command in-order from the non-deterministic memory sub-system's perspective. The data movement command is then issued by the memory sub-system controller for execution, followed by the read command for execution. If the memory fence command was not provided, the non-deterministic protocol of the memory sub-system could issue the read command ahead of the slower data movement command, which would result the incorrect data being read if the data movement command hadn't moved data to the address of the read command before the read command was executed. Also, the non-deterministic protocol allows commands to be execution in a different order than they are received by the memory sub-system, therefore if the memory fencing command was not provided and the address where the data movement command moved data to was different than the address where the read command read data from, the memory sub-system may issue the read command for execution prior to issuing the data movement command to get better read latency on that read request, thereby improving the overall quality of service of the memory sub-system.

Figure 1:
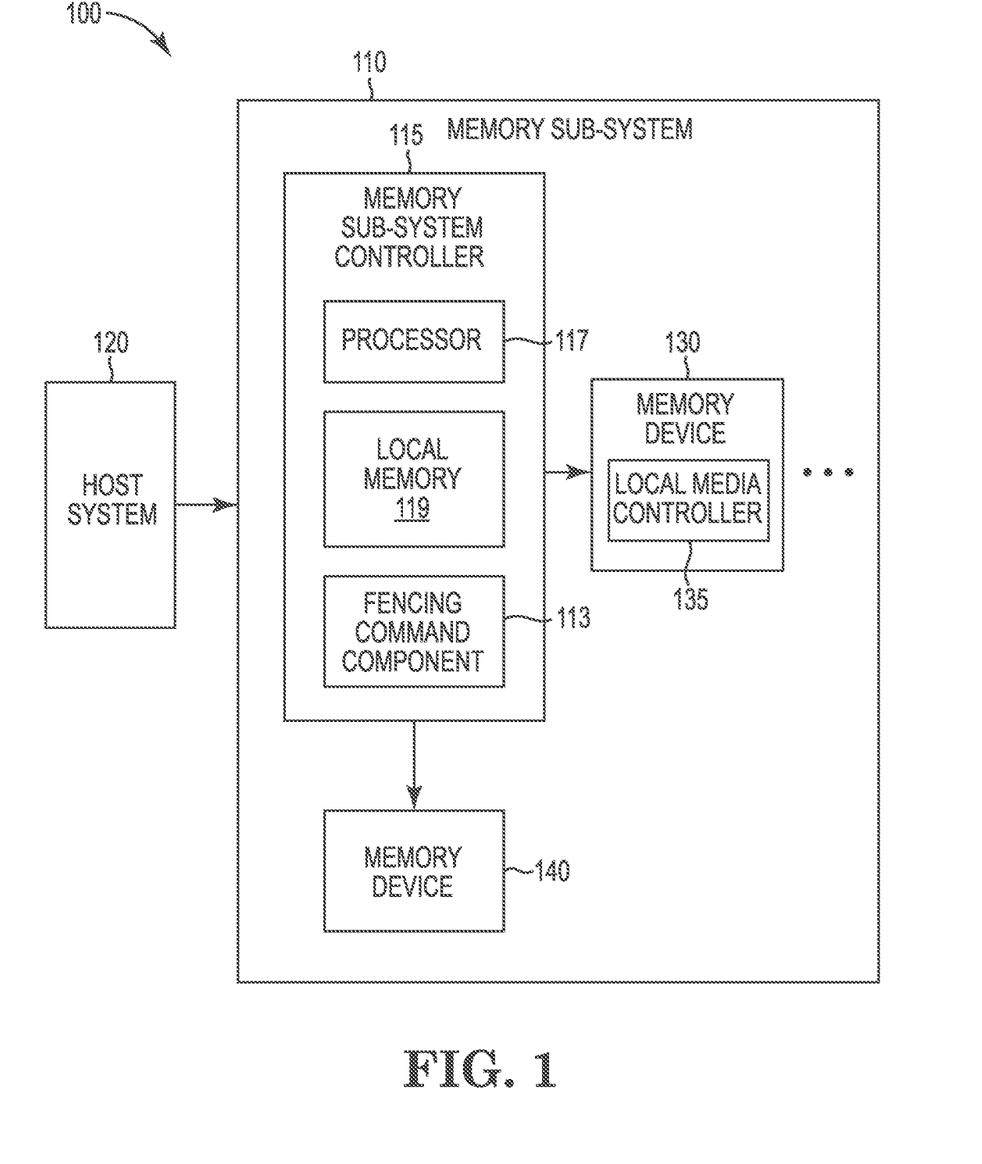
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a memory fencing component 113. Although not shown in FIG. 1 so as to not obfuscate the drawings, the memory fencing component 113 can include various circuitry to facilitate receiving memory fencing commands from a host system 120 and executing commands on the memory sub-system 110 according to the instructions in the memory fencing commands. In some embodiments, the memory fencing component 113 can include special purpose circuitry in the form of an ASIC, FPGA, state machine, and/or other logic circuitry that can allow the memory fencing component 113 to orchestrate and/or perform operations to selectively perform memory fencing for the memory device 130 and/or the memory device 140 based on determined instruction in the memory fencing commands.

In some embodiments, the memory sub-system controller 115 includes at least a portion of the memory fencing component 113. For example, the memory sub-system controller 115 can include a processor 117 (processing device) configured to execute instructions stored in local memory 119 for performing the operations described herein. In some embodiments, the memory fencing component 113 is part of the host system 110, an application, or an operating system.

In a non-limiting example, an apparatus (e.g., the computing system 100) can include a memory sub-system memory fencing component 113. The memory sub-system memory fencing component 113 can be resident on the memory sub-system 110. As used herein, the term "resident on" refers to something that is physically located on a particular component. For example, the memory sub-system memory fencing component 113 being "resident on" the memory sub-system 110 refers to a condition in which the hardware circuitry that comprises the memory sub-system memory fencing component 113 is physically located on the memory sub-system 110. The term "resident on" can be used interchangeably with other terms such as "deployed on" or "located on," herein.

The memory sub-system memory fencing component 113 can receive memory fencing commands from host system 120 and execute commands on the memory sub-system 110 according to instruction in the memory fencing commands. For example, a memory fencing command can be a data movement memory fencing command with instructions that all data movement commands received prior to the data movement fencing command must be performed before any read commands received prior to the data movement fencing command. Also, a memory fencing command can be a data movement memory fencing command with instructions that all data movement commands that move data to an address in the memory sub-system that is associated with a data read command (e.g., data is being read from an address in the memory sub-system that is the destination of a data movement command on the memory sub-system) must be performed before the associated read commands (e.g., the read commands that are reading data from a destination of a data movement command).

The memory sub-system 110 can be configured to perform read, write, data movement, encryption, compression, and logic operations on data in memory device 130 and 140. The memory device 130 and 140 can be part of a memory sub-system that uses a non-deterministic protocol, such as an NDVIMM-P module and/or a CXL connected memory device. The memory sub-system memory fencing component 113 can receive memory fencing commands with instructions associated with read fencing commands, write fencing commands, data movement fencing commands, encryption fencing commands, compression fencing commands, and/or logic operation fencing commands, among other types of fencing commands. The memory sub-system memory fencing component 113 can cause execution of the certain types of commands (e.g., read, write, move, encrypt, compress, logic operations, among other) before other commands are executed according to instruction in the memory fencing commands.

Figure 2:
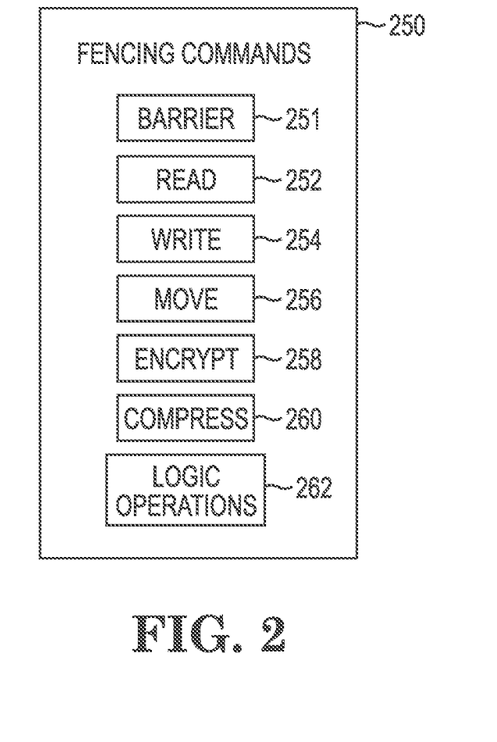
FIG. 2 is a block diagram corresponding to memory sub-system memory fencing commands in accordance with some embodiments of the present disclosure.

FIG. 2 is a block diagram corresponding to memory sub-system memory fencing commands in accordance with some embodiments of the present disclosure. In a number of embodiments, fencing commands 250 can include barrier fencing commands 251, read fencing commands 252, write fencing command 254, move fencing commands 256, encrypt fencing commands 258, compress fencing commands 260, and logic operation fencing commands 262.

The memory sub-system memory fencing component can cause execution of a first number of commands before a second number of commands according to instruction in a barrier fencing command 251. For example, a first number of commands can be received, then a barrier fencing command 251 can be received, and then a second number of commands can be received. The barrier fencing commands can include instructions to perform each of the first number of commands before performing any of the second number of commands. The first number of commands and the second number of commands can be any type of command, such as read, write, data movement, encrypt, compress, and/or logic operations, or any combination of the various types of commands.

The memory sub-system memory fencing component can cause execution of the read commands before other commands according to instruction in a read fencing command 252. For example, a read fencing command 252 can include instructions to perform a read operation that read data from a location with an address in the memory sub-system before performing a write operation to write data to the location with the address in the memory sub-system.

The memory sub-system memory fencing component can cause execution of the write commands before other commands according to instruction in a write fencing command 254. For example, a write fencing command 254 can include instructions to perform a write operation that writes data to a location with an address in the memory sub-system before performing a read operation to read the data from the location with the address in the memory sub-system.

The memory sub-system memory fencing component can cause execution of the data movement commands before other commands according to instruction in a data movement fencing command 256. For example, a data movement fencing command 256 can include instructions to perform a data movement command to move data to a location with an address in the memory sub-system before performing a read command that reads from the location with the address in the memory sub-system.

The memory sub-system memory fencing component can cause execution of the encryption commands before other commands according to instruction in an encryption fencing command 258. For example, an encryption fencing command 258 can include instructions to perform an encryption command to encrypt data from a first location with a first address and store the encrypted data in a second location with a second address in the memory sub-system before performing a read command that reads from the second location with the second address in the memory sub-system.

The memory sub-system memory fencing component can cause execution of the compression commands before other commands according to instruction in a compression fencing command 260. For example, a compression fencing command 260 can include instructions to perform a compression command to compress data from a first location with a first address and store the compressed data in a second location with a second address in the memory sub-system before performing a read command that reads from the second location with the second address in the memory sub-system.

The memory sub-system memory fencing component can cause execution of the logic operation commands before other commands according to instruction in a logic operation fencing command. For example, a logic operation fencing command 262 can include instructions to perform a logic operation command to perform a logic operation on data from a first location with a first address and a second location with a second address; and store the result of the logic operation in a third location with a third address in the memory sub-system before performing a read command that reads from the third location with the third address in the memory sub-system. The memory sub-system can be configured to execute logic operation on the memory sub-system such as AND, OR, XOR operation, among other types of logic operations.

Figure 3:
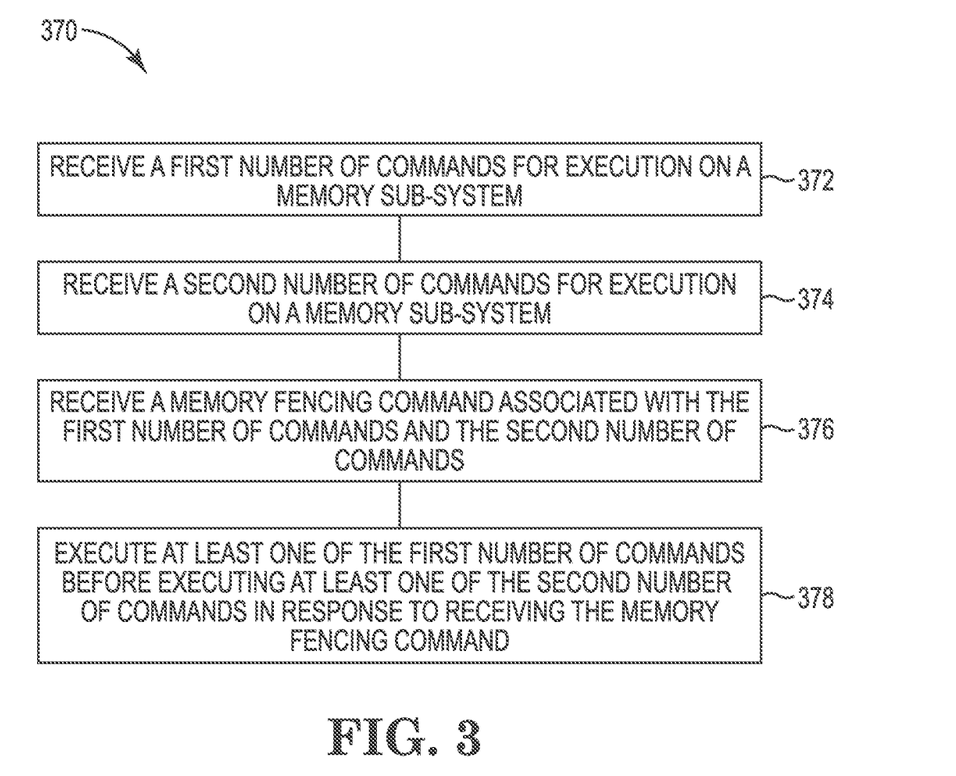
FIG. 3 is a flow diagram corresponding to a method for memory sub-system command fencing in accordance with some embodiments of the present disclosure.

FIG. 3 is flow diagram corresponding to a method 370 for memory fencing in accordance with some embodiments of the present disclosure. The method 370 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 370 is performed by the fencing command component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 372 a first number of commands can be received for execution on a memory sub-system. In some embodiments, the memory sub-system can be analogous to the memory sub-system 110 illustrated in FIG. 1.

At operation 374, a second number of commands can be received for execution on the memory sub-system. The first number of commands can be be read commands, write commands, data movement commands, encryption commands, compression command, and/or logic operation commands, among other types of commands.

At operation 376, a memory fencing command associated with the first number of commands and the second number of commands can be received by the memory sub-system.

At operation 378, at least one of the first number of commands can be executed before at least one of the second number of commands in response to receiving the memory fencing command.

In some embodiments, the method 370 can include performing a read command before performing a data movement command, even if a read fencing command has been received, when the read command reads data from a location in the memory sub-system that is not associated with a data movement command (e.g., the memory sub-system command queue does not have a data movement command that moves data to the location where the read command is reading data from).

Figure 4:
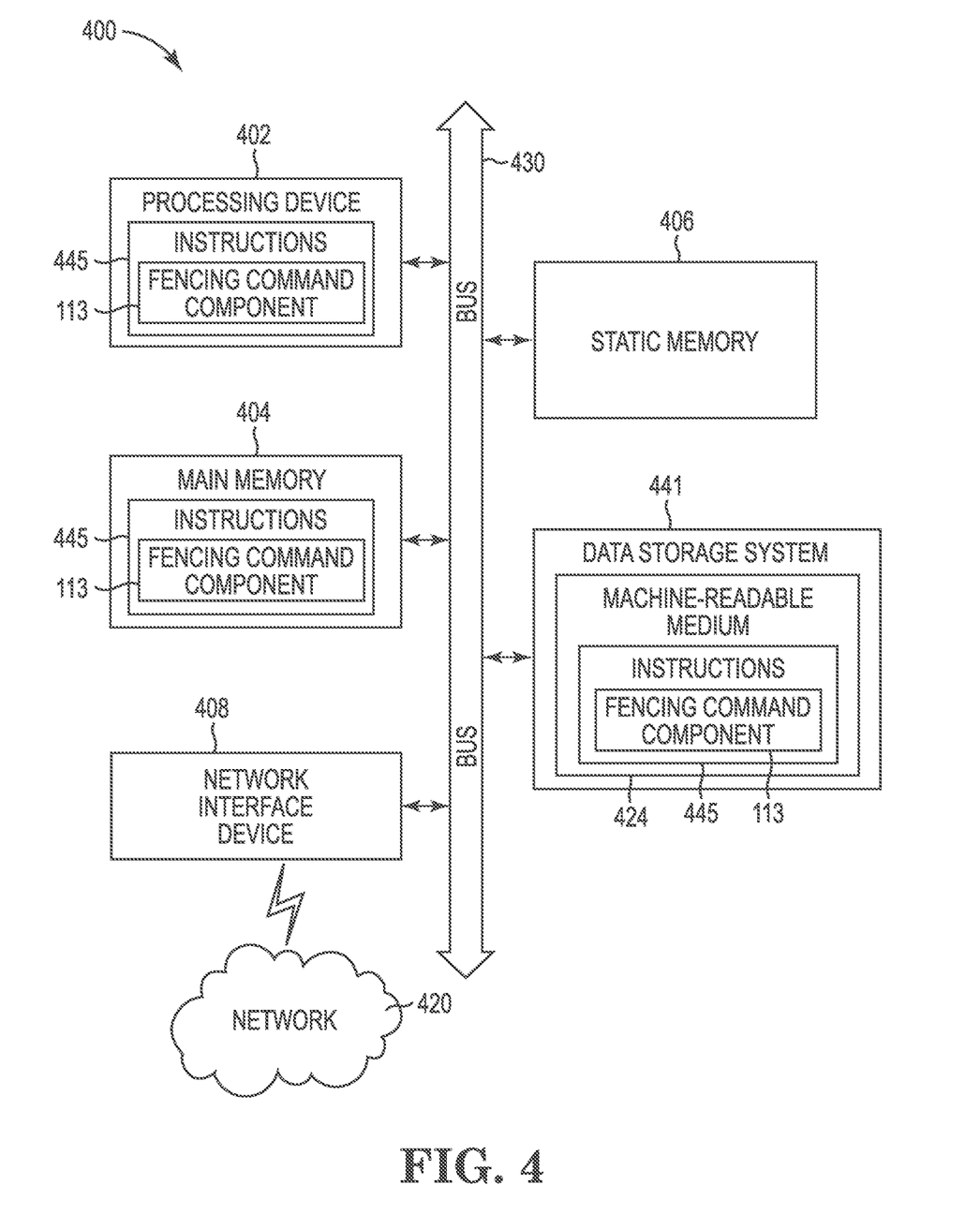
FIG. 4 is a block diagram of an example computer system in which embodiments of the present disclosure may operate.

FIG. 4 is a block diagram of an example computer system 400 in which embodiments of the present disclosure may operate. For example, FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the fencing command component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 441, which communicate with each other via a bus 430.

The processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 445 for performing the operations and steps discussed herein. The computer system 400 can further include a network interface device 408 to communicate over the network 420.

The data storage system 441 can include a machine-readable storage medium 424 (also known as a computer-readable medium) on which is stored one or more sets of instructions 445 or software embodying any one or more of the methodologies or functions described herein. The instructions 445 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 441, and/or main memory 404 can correspond to the memory sub-system 110 of FIG. 1.

In one embodiment, the instructions 426 include instructions to implement functionality corresponding to a fencing command component (e.g., the fencing command component 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   receiving a first number of commands for execution on a memory sub-system;
   receiving a second number of commands for execution on the memory sub-system;
   receiving a memory fencing command associated with the first number of commands and the second number of commands; and
   executing the first number of commands in any order and executing at least one of the second number of commands after execution of at least one of the first number of commands in response to receiving the memory fencing command, wherein the at least one of the first number of commands writes data to a first location in the memory sub-system and the at least one of the second number of commands reads the data from the first location in the memory sub-system.

2. The method of claim 1, wherein executing the at least one of the first number of commands includes moving data from a second location in the memory subsystem to the first a location in the memory sub-system.

3. The method of claim 2, wherein executing the at least one of the second number of commands includes reading the data from the second location in the memory sub-system and sending the data to a host system.

4. The method of claim 1, further includes executing another of the second number of commands before executing all of the first number of commands, wherein executing the another of the second number of commands includes reading data from a third location of the memory sub-system and sending the data to a host system.

5. The method of claim 4, wherein the third location of the memory sub-system is not associated with any of the first number of commands.

6. The method of claim 1, further including performing a portion of the first number of commands that move data to locations in the memory sub-system associated with the second number of commands before performing a portion of the second number of commands associated with the locations in the memory sub-system in response to receiving the memory fencing command.

7. The method of claim 1, wherein the portion of the first number of commands are data movement commands within the memory sub-system and the portion of the second number of commands are read commands.

8. An apparatus, comprising:
   a memory device; and
   a memory sub-system controller coupled to the memory device, wherein the memory subsystem controller includes a memory sub-system memory fencing component having logic circuitry configured to:
   receive a number of commands and a memory fencing command; and
   execute at least one of a first portion of the number of commands before executing at least one of a second portion of the number of commands in response to instructions in the memory fencing command, wherein the at least one of the first portion of the number of commands writes data to a first location in the memory device and the at least one of the second number of commands reads the data from the first location in the memory device.

9. The apparatus of claim 8, wherein the memory fencing command includes instruction to perform data movement commands before performing read commands.

10. The apparatus of claim 8, wherein the at least one of the first portion of the number of commands are executed to move data from a second location in the memory sub-system to the first location in the memory sub-system.

11. The apparatus of claim 10, wherein the at least one of the first portion of the number of commands are executed to move data from a non-volatile memory device to a volatile memory device.

12. The apparatus of claim 10, wherein the at least one of the second portion of the number of commands are executed to read data from the first location in the memory sub-system.

13. The apparatus of claim 8, wherein another of the second portion of the number of commands is not associated with an address that is associated with the first portion of the number of commands.

14. The apparatus of claim 13, wherein execution of the another of the second portion of the number of commands is executed independently of the instructions in the memory fencing command.

15. An apparatus, comprising:
   a memory device; and
   a memory sub-system controller coupled to the memory device, wherein the memory subsystem controller includes a memory sub-system memory fencing component having logic circuitry configured to:
   receive a first number of commands, a second number of commands, and a memory fencing command; and
   execute the first number of commands in any order and execute at least one of the second number of commands after execution of at least one of the first number of commands in response to receiving the memory fencing command, wherein the at least one of the first number of commands writes data to a first location in the memory device and the at least one of the second number of commands reads the data from the first location in the memory device.

16. The apparatus of claim 15, wherein the instructions in the memory fencing command include instructions to perform data encryption and compressions operations before performing read operations.

17. The apparatus of claim 15, wherein the first number of commands include data encryption and compression commands and the second number of commands include read commands.

18. The apparatus of claim 15, wherein the instructions in the memory fencing command include instructions to perform logic operations before performing read operations.

19. The apparatus of claim 15, wherein the first number of commands includes instructions to perform logic operations on data from the first location and a second location in the memory device and store the result in a third location in the memory device.

20. The apparatus of claim 15, wherein the second number of commands include instructions to read data from the third location in the memory device.

* * * * *